3,527,646
METHOD OF COATING FOODS WITH PREGELATINIZED STARCH
Karl A. Scheick, Griffith, Ind., Louis Jokay, Evanston, Ill., and Glen E. Nelson, Highland, Ind., assignors to American Maize-Products Company, a corporation of Maine
No Drawing. Filed Sept. 12, 1966, Ser. No. 578,497
Int. Cl. A23b 7/16
U.S. Cl. 99—166
12 Claims

ABSTRACT OF THE DISCLOSURE

The present invention relates to a method of coating foods with an edible amorphous film containing a pregelatinized starch as the essential ingredient and to the products produced thereby. The process includes the following four steps: (1) a small quantity of moisture is provided on the surface of the food to be coated if dry starch powder will not adhere thereto; (2) a dry powder containing one or more pregelatinized starch materials as a major ingredient is applied to the premoistened surface of the food; (3) the layer of powder applied to the food is moistened in a limited manner to form a continuous colloidal suspension on the food surface; and (4) the suspension of powder is dried to form an amorphous flexible film on the surface of the food to provide the coating of the present invention. The pregelatinized starch which constitutes an essential ingredient in the process of this invention may be formed from a modified starch; a starch derivative or a high amylose starch derivative.

---

This invention relates to a method of coating foods with an edible amorphous film containing a pregelatinized starch as the essential ingredient. More particularly, the invention provides a coating method which utilizes very limited quantities of moisture or liquid in its operating steps and thus the method is essentially a "dry" method which gives the advantages of cost economy, high rate of production and accurate control of physical characteristics of the final product.

Food coatings are known and used in the art primarily as flavor vehicles which are readily noted by the consumer and enjoyed because of their obvious effect on taste and palatability. For example, chocolate-covered ice cream, fruits and nuts, hard sugar-coated fruits and nuts, and meats enclosed in cooked-batter skins all include a coating which contributes to the flavor of the food and is used exclusively or primarily for that purpose. Less well known are functional food coatings which impart little or no flavor, are not readily noticed by the consumer and are used primarily to improve functional characteristics of a food, e.g. retention of volatile flavor components, inhibition of spoilage or prevention of sticking together, etc.

The present invention is directed mainly to functional food coatings in the sense that extremely valuable benefits and advantages can be achieved in improving functional or physical characteristics of foods by use of the invention without affecting the natural flavor of the food. However, due to the versatility of the method provided by the invention, it may also be used to enhance the flavor of foods and such a consideration therefore is within the scope of the invention.

The invention is based upon the discovery that pregelatinized starches and derivatives thereof, when applied as a dry powder to pre-moistened food surfaces and then moistened again, form a continuous colloidal suspension which subsequently dries to an amorphous, flexible film tightly adhered to the food surface. When films are formed in this manner, every crevice and ridge of the food surface becomes completely covered regardless of how complex or nonuniform the surface configuration. The film provides a smooth, non-tacky coating which simplifies the packaging and handling of normally tacky or sticky foods or hygroscopic foods which become tacky by absorption of moisture. The film provides a gloss and sheen and, because the film is also tarnsparent, the natural color and appearance of the food is considerably enhanced. The film provides a grease barrier whereby fatty foods which normally exude oils and fats remain dry and non-greasy to the touch when coated by the method of the invention.

In addition to the foregoing advantages, the coatings provided by the invention have been demonstrated to give considerable protection against oxidative deterioration of certain foods such as nut meats, apparently by preventing or diminishing oxygen ingress to the food enclosed within the coating. A similar effect has been noted in the retention of volatile flavor components, viz foods having volatile flavors and aromas have been coated by the method of the invention and found to retain such volatile components much longer during storage. Another valuable benefit is the structural reinforcement of fragile food pieces. For example, dried beans have been coated in accordance with invention and thereby given considerable protection against splitting and loss of hulls. Likewise, the strength of shell eggs has been considerably increased by coatings formed thereon by the method of the invention.

As previously noted, all of the foregoing functional advantages are achieved without affecting the natural flavor of foods since the coatings provided by the invention are practically tasteless. However, if desired, flavor ingredients can be readily incorporated in the coating to modify or enhance the flavor of the food to be coated. This is simply done by including solid flavor particles in the pregelatinized starch powder which is applied to the moistened food surface in accordance with the invention. When the applied powder is subsequently rehydrated and dried to form the desired film or coating, the flavor particles will be homogeneously incorporated therein to provide an additional, non-functional advantage. In similar manner, other beneficial ingredients such as colors, vitamins, mineral salts, non-nutritive sweeteners, antioxidants and preservatives can be incorporated to improve the final coated product.

In carrying out the process of the invention, four essential steps must be followed. First, a small quantity of moisture is provided on the surface of the food to be coated. The second step is to apply a dry powder containing one or more pregelatinized starch materials as the major ingredient to the pre-moistened surface of the food. Next, the powder layer applied to the food is moistened in a limited manner to form a continuous colloidal suspension on the food surface. Finally, the suspension is dried to form an amorphous flexible film on the food surface which comprises the coating provided by the invention.

As mentioned above, it is necessary that the dry powder used in the process of the invention contain one or more pregelatinized starches as the major ingredient, which means that at least about 50% of the weight of the powder will comprise pregelatinized starch. In general, any pregelatinized starch may be employed since the moistening step following application of the powder to the food surface will cause a pregelatinized starch in the form of fine particles to form a continuous colloidal suspension as is necessary to cover the food surface with a coating by the method of the invention. Accordingly, unmodified starch such as ordinary corn starch and modified starch such as oxidized, acid-treated, cross-linked, partially-hydrolyzed or enzyme-converted starch which has been pregelatinized and dried to a powder may be used alone or in mixtures as the major essential ingredient in the powder to be applied to the food surface. In addition, starch derivatives such as ethers and esters, and in particular hydroxyalkyl ethers such as hydroxyethyl and hydroxypropyl starch ethers, in pregelatinized powder form may also be used. Of particular interest are derivatives of high amylose content starches which are special genetic species of starch containing from 55% to 70% of amylose, the linear fraction of all natural starches. Thus, hydroxyethyl and hydroxypropyl ethers of high amylose starch, pregelatinized and powdered, are excellent base ingredients for producing coatings on food surfaces in accordance with the invention.

While any one of the starch ingredients described above may be used alone, the best results are achieved with powders containing mixtures of different starches. Thus, a mixture of hydroxyalkyl ether of high amylose or ordinary starch with oxidized and/or enzyme-converted waxy maize starch, in relative weight proportions of 5 to 60% hydroxyalkyl ether, zero to 20% oxidized waxy maize and 10 to 60% enzyme-converted waxy maize, is more advantageous for practical commercial operations than use of any one of such ingredients alone. The hydroxyalkyl ether derivative gives strength and flexibility to the final coating and the waxy maize starches contribute gloss and transparency. Other beneficial ingredients which may be used include glycerine and gelatin which contribute to flexibility and strength, and gelatin also accelerates the setting and drying time in the final step of the process. The amount of gelatin may be from zero to 50% by weight and glycerine may be included in smaller amounts from zero up to about 25% by weight. Other ingredients previously mentioned such as flavors, colors, vitamins, mineral salts, sugars, non-nutritive sweeteners, antioxidants and preservatives may be included in admixture with the base pregelatinized starch material. Generally speaking, such ingredients are included in small amounts up to about 15% by weight in the case of sugar and up to about 5% for the others. In all cases, the amount of additional ingredients must not be so high as to disrupt the continuity of the flexible amorphous film formed on the food surface by the process of the invention. Therefore, at least about 50% by weight of the powder applied to the food must be pregelatinized starch to ensure continuity and to achieve the functional benefits of the final coating formed on the food surface.

The pregelatinized starch powder to be used in accordance with the invention is prepared in conventional manner using wet or dry blending techniques or both. For example, ungelatinized starch materials and all other non-heat sensitive ingredients which are to be included can be slurried in water and then cooked at elevated temperature to gelatinize the starch. The resulting cooked starch dispersion is then dried to a powder form with drum dryers or other drying means. If desired, additional solid ingredients can then be admixed with the powder in a dry blending apparatus of which various forms are well known and conventional in the art. Alternatively, all of the ingredients including pregelatinized starches can be obtained in solid form and admixed in a dry blender to form a powder for use in the coating method of the invention.

In practicing the invention, the first step is to provide a fine layer or film of moisture on the surface of the food to be coated. The purpose of this step is to cause the subsequently applied particles of the pregelatinized starch powder to stick to the surface in a uniform coat. Therefore, if the food surface inherently is capable of holding on to the starch particles, then application of a moisture film will not be necessary. As an example of this, certain candies are inherently sticky due to the presence of crystallization inhibitors such as corn syrup or invert sugar and pregelatinized starch particles will readily stick to such candies without pre-moistening their surfaces. Where however the food surface cannot retain the starch particles or where it is desired to augment the holding power of the food surface, it is necessary to establish a moisture film thereon. This can be done in various ways one of which is direct contact with moisture applied as a fine mist or spray. Another way is to first chill or freeze the food and then expose it to moist air to condense a moisture film on its surfaces. Still another way is to expose the food to steam for a sufficient time until a thin film of moisture accumulates on the surface. In all cases, only a thin moisture film is necessary on the food surface and the food can be supported on wire screens or other open supports during the moistening step to expose the maximum surface and minimize any tendency toward sticking.

Following the moistening step, the food is coated with the particles of a pregelatinized starch powder as previously described. One way to do this is to place the starch powder in a rotating inclined pan and then drop the food pieces into the pan at a controlled rate to allow the pieces to pick up a uniform layer of particles as they roll and tumble in the pan. The dry coating of the starch particles can be accomplished in other ways through use of rotating drums, oscillating belts or tables or other conventional apparatus which will apply solid particles to the surface of the food pieces. Due to the naturally sticky or pre-moistened surfaces, the starch particels will adhere to the food and form a uniform dry coat over the whole surface. If necessary, the food pieces can be shaken on wire screens to remove any excess powder that may happen to stick to the food.

In the next step, the food pieces with their coat of pregelatinized starch particles are moistened or rehydrated in order to convert the solid particles into a continuous wet layer in the nature of a colloidal suspension surrounding the entire surface of each piece of food. This again can be done in various ways such as applying a fine mist or spray of moisture of a fog of steam. Excessive heat is not necessary and should be avoided, especially where the food itself is heat sensitive. The pregelatinized starch particles on the surfaces of the food will readily fuse into a continuous layer from the action of a light moisture application alone and excessive heat or moisture is not only unnecessary but may even adversely affect the characteristics of the final coating. Therefore, the moistening step should be limited in time and degree to the minimum treatment that is effective for achieving the continuous layer of colloidal suspension on the food surfaces which can be readily determined by observation.

In the final step, the continuous colloidal suspension on the food surfaces is dried and dehydrated to form a thin, flexible, amorphous film which adheres tenaciously to the surface of each piece of food. Such drying may be accomplished by exposing the food pieces to cool air, to dehumidified cool air having less than 25% relative humidity, to ambient air having less than 50% relative humidity or to elevated temperatures in a drying tunnel. Permissible elevated temperatures above ambient for drying are governed by the particular food and/or coating since, as a practical matter, only temperatures less than that which will degrade the coated food or the coating thereon can be used. When drying is completed the amorphous flexible film on each piece of food will be smooth and non-tacky to the touch and will have a transparent, glossy appearance, which characteristics are readily observable.

The method of the invention provides protective coatings on the surface of virtually any type of food and can be practiced with simple, readily available equipment. The method is highly economical as compared to other methods which use liquid coating compositions since large amounts of water need not be eliminated and the consequent reduction in power costs, drying time and size of apparatus gives a substantial savings. As a matter of fact, since the method does not require use of heat at all, many foods can be coated which would be impossible to coat by conventional techniques involving use of heat, as for example, the application of hot melts. Finally, the method of the invention may be readily carried out on a continuous basis to achieve a high manufacturing output of coated foods having the various functional benefits and advantages contributed by the coating as previously described.

The following examples will illustrate further details of the method of the invention and constitute preferred embodiments thereof. All proportions given in the examples are by weight unless otherwise specified.

EXAMPLE 1

A finely divided powder was prepared containing the following ingredients in the specified relative proportions of weight percentages based on the total weight of the powder:

| | Percent |
|---|---|
| Pregelatinized hydroxypropyl ether of high amylose starch | 5.6 |
| Pregelatinized enzyme-converted waxy maize starch | 55.6 |
| Pregelatinized oxidized waxy maize starch | 16.6 |
| Gelatin | 16.6 |
| Sucrose | 5.6 |

EXAMPLE 2

A finely divided powder was prepared containing the following ingredients in the specified proportions of weight percentages based on the total weight of the powder:

| | Percent |
|---|---|
| Pregelatinized hydroxypropyl ether of high amylose starch | 15 |
| Pregelatinized enzyme-converted waxy maise starch | 50 |
| Pregelatinized oxidized waxy maize starch | 15 |
| Gelatin | 15 |
| Sucrose | 5 |

EXAMPLE 3

A finely divided powder was prepared containing the following ingredients in the specified relative proportions of weight percentages based on the total weight of the powder:

| | Percent |
|---|---|
| Pregelatinized hydroxypropyl ether of high amylose starch | 50 |
| Pregelatinized enzyme-converted waxy maise starch | 15 |
| Pregelatinized oxidized waxy maize starch | 15 |
| Gelatin | 15 |
| Sucrose | 5 |

EXAMPLE 4

A finely divided power was prepared containing the following ingredients in the specified relative proportions of weight percentages based on the total weight of the powder:

| | Percent |
|---|---|
| Pregelatinized hydroxypropyl ether of high amylose starch | 45.6 |
| Pregelatinized enzyme-converted waxy maize starch | 13.6 |
| Pregelatinized oxidized waxy maize starch | 13.6 |
| Gelatin | 13.6 |
| Sucrose | 13.6 |

EXAMPLE 5

A finely divided powder was prepared containing the following ingredients in the specified relative proportions of weight percentages based on the total weight of the powder:

| | Percent |
|---|---|
| Pregelatinized hydroxypropyl ether of high amylose starch | 38.1 |
| Pregelatinized enzyme-converted waxy maize starch | 38.1 |
| Pregelatinized thin boiling waxy maize starch | 14.3 |
| Sucrose | 9.5 |

EXAMPLE 6

A finely divided powder was prepared containing the following ingredients in the specified relative proportions of weight percentages based on the total weight of the powder:

| | Percent |
|---|---|
| Pregelatinized hydroxypropyl ether of corn starch | 38.125 |
| Pregelatinized enzyme-converted waxy maize starch | 38.125 |
| Pregelatinized thin boiling waxy maize starch | 4.75 |
| Gelatin | 9.5 |
| Sucrose | 9.5 |

EXAMPLE 7

Each of the powders described in Examples 1–6 were used to form coatings, by the method described below, upon various foods such as caramel cubes, semi-dried prunes, dates, figs, dried peaches, and an assortment of cubed fruits used in fruit cake.

The food pieces were first exposed to steam to deposit a film of moisture upon the surfaces thereof. Then the powder mixture was placed in a revolving inclined pan sold under the trademark Ter Braak by the National Equipment Corporation of New Brunswick, N.J. and ordinarily used for candy coatings. The food pieces were slowly fed into the pans and particles of the powder mixture adhered to the moistened surface of the food to form substantially uniform coating thereon. The dry coated food pieces were then again exposed to steam whereby the coated particles of the powder mixture fused into a continuous layer having the nature of a colloidal suspension.

Following this, the food pieces were dried in ambient air of low relative humidity. This resulted in the formation of an amorphous flexble film around the entire surface of each piece of food. The film was non-tacky, transparent, with varying degrees of loss, and in all cases firmly adhered to the surface of the food pieces.

EXAMPLE 8

In this example, amorphous, flexible films were formed on various foods with starch powders, using the method described in Example 7, but in each instance the powder mixtures contained only one starch ingredient as contrasted from the mixtures of Examples 1–6 and had the following compositions:

(1) Pregelatinized hydroxypropyl ether of starch having more than 50% natural amylose content and 16.5% glycerine.

(2) Pregelatinized oxidized waxy maize starch and 5 to 8% sucrose.

(3) Pregelatinized waxy maize starch and 8% sucrose.

(4) Pregelatinized waxy maize starch cross-linked by reaction with phosphorous oxychloride.

(5) Pregelatinized corn starch.

(6) Pregelatinized enzyme-converted waxy maize starch and 8% gelatin.

(7) Pregelatinized oxidized corn starch. The films resulting from these starch powders formed a continuous coating on the surface of the food as was the case in Examples 1–7. In general, the films of this example had considerably less gloss and dried over longer periods of time as compared to Examples 1–7.

As previously mentioned, the method of the invention has also been used to coat beans and whole eggs in shells to obtain flexible amorphous films which improved the food in the manner previously described.

We claim:

1. A method of coating pieces of food with an edible, amorphous, flexible film which is a continuous film that provides a grease and air barrier which comprises the steps of moistening the surface of each piece of food to render said surface adherent to particles of a pregelatinized starch, placing upon said moistened surface a finely-divided powder at least about 50% of the weight of which comprises at least one pregelatinized starch, pregelatinized starch ether or pregelatinized starch ester, moistening the powder placed upon said surface to convert the pregelatinized starch thereof into a continuous layer in the nature of a colloidal suspension, and drying said layer to form said edible, amorphous flexible film, which is a continuous film that provides a grease and air barrier said film being non-tacky to the touch and firmly adhered to said food surface.

2. A method as in claim 1 wherein said powder includes at least 50% of a pregelatinized hydroxypropyl ether of a starch having an amylose content greater than 50% by weight.

3. A method as in claim 1 wherein said powder comprises a mixture of pregelatinized hydroxypropyl starch ether, pregelatinized oxidized waxy maize starch and pregelatinized enzyme-converted waxy maize starch.

4. A method as in claim 1 wherein said powder comprises a mixture of pregelatinized hydroxypropyl starch ether, pregelatinized oxidized waxy maize starch and pregelatinized thin boiling waxy maize starch.

5. A method as in claim 1 wherein said powder includes gelatin.

6. A method as in claim 1 wherein said first moistening step is carried out by chilling the food piece below ambient temperature and then exposing the chilled food piece to ambient air to condense moisture from the air upon the surface of the food piece.

7. A method as in claim 1 wherein said first moistening step is carried out by directing a fine spray of moisture upon the surface of said food piece.

8. A method as in claim 1 wherein said food pieces are rolled and tumbled in said finely-divided powder to coat the moistened surfaces of said food pieces with said powder.

9. A method as in claim 1 wherein said second moistening step is carried out by directing steam upon the powder placed upon the surfaces of said food pieces.

10. A method as in claim 1 wherein said continuous layer is dried at temperatures above ambient temperature.

11. In a method of coating pieces of food with an edible, amorphous flexible film which is a continuous film that provides a grease and air barrier wherein said food pieces have a surface which is adherent to particles of a pregelatinized starch, the steps which comprise placing upon said surface a finely-divided powder at least about 50% of the weight of which comprises at least one pregelatinized starch, pregelatinized starch ether or pregelatinized starch ester, moistening the powder placed upon said surface to convert the pregelatinized starch thereof into a continuous layer in the nature of a colloidal suspension, and drying said layer to form said edible, amorphous, flexible film which is a continuous film that provides a grease and air barrier said film being non-tacky to the touch and firmly adhered to said food surface.

12. A method as in claim 1 wherein said powder includes up to about 15% by weight of sugar.

References Cited

UNITED STATES PATENTS

| | | | |
|---|---|---|---|
| 1,483,136 | 2/1924 | Walsh | 106—30 X |
| 2,308,185 | 1/1943 | Lindsay et al. | 106—157 |
| 3,052,545 | 10/1962 | Ducharme et al. | 99—83 |
| 3,122,534 | 2/1964 | Muetgeert et al. | 260—209 |
| 3,329,509 | 7/1967 | Julius | 99—171 |
| 3,368,909 | 2/1968 | Moore et al. | 99—168 |
| 3,427,951 | 2/1969 | Mitan et al. | 99—166 |
| 2,909,435 | 10/1959 | Watters et al. | 99—168 |
| 3,332,785 | 7/1967 | Kuchinke et al. | 99—139 |
| 3,406,078 | 10/1968 | Williams | 99—168 |

A. LOUIS MONACELL, Primary Examiner

R. B. ANDEWELT, Assistant Examiner

U.S. Cl. X.R.

19—168